June 30, 1925.
G. E. STEWART
1,544,536
CONTROL SYSTEM FOR ELECTRIC SWITCHES
Filed April 17, 1924
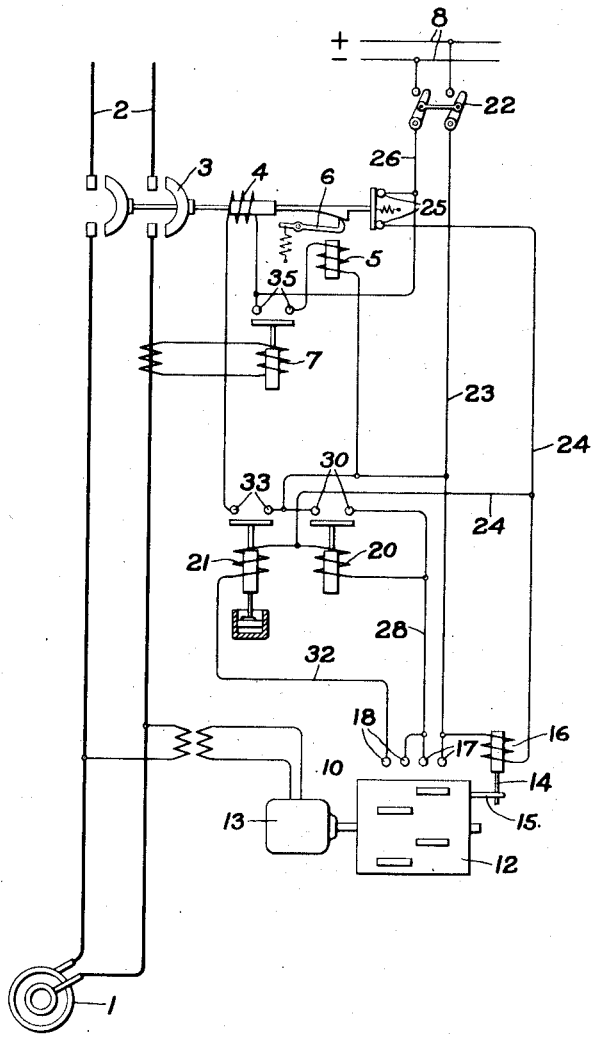
Inventor:
Glenn E. Stewart,
by *[signature]*
His Attorney.

Patented June 30, 1925.

1,544,536

UNITED STATES PATENT OFFICE.

GLENN E. STEWART, OF PHILADELPHIA, PENNSYLVANIA, ASSIGNOR TO GENERAL ELECTRIC COMPANY, A CORPORATION OF NEW YORK.

CONTROL SYSTEM FOR ELECTRIC SWITCHES.

Application filed April 17, 1924. Serial No. 707,243.

*To all whom it may concern:*

Be it known that I, GLENN E. STEWART, a citizen of the United States, residing at Philadelphia, in the county of Philadelphia, State of Pennsylvania, have invented certain new and useful Improvements in Control Systems for Electric Switches, of which the following is a specification.

My invention relates to control systems for electric switches and particularly to systems in which switches, such as circuit breakers, are automatically opened upon the occurrence of an abnormal condition such as an overload and are arranged to be closed by operating suitable control switches to complete the circuit of electromagnetic means which are arranged to close the circuit breakers.

If a control switch remains in its circuit-closing position, after the circuit breaker closes, and if the circuit breaker immediately opens due to an abnormal condition on the electric circuit controlled thereby, it is evident that the closing circuit of the circuit breaker is again completed as soon as the circuit breaker reaches its open position and the circuit breaker is again closed. Under these conditions the circuit breaker continues to open and close rapidly as long as the abnormal condition is present and the control switch remains in its circuit-closing position. This action, if allowed to continue, may seriously damage the apparatus.

My invention is of particular utility in automatic reclosing circuit breaker systems in which the closing circuit of a circuit breaker is automatically completed after the circuit breaker has been opened in response to an abnormal condition and has remained opened for a certain length of time. In such systems it is the practice to provide suitable automatic switching means which effects the completion of the closing circuit of the circuit breaker in the desired manner. If, for any reason the automatic switching means should stop in its circuit-closing position, the circuit breaker controlled thereby would open and close successively in the same manner as above described if there were an overload on the circuit controlled by the circuit breaker.

One object of my invention is to provide an improved arrangement for preventing the successive opening and closing of a circuit breaker under the conditions mentioned above.

My invention will be better understood from the following description, when taken in connection with the accompanying drawing, which shows an automatic reclosing circuit breaker system embodying my invention, and its scope will be pointed out in the appended claims.

Referring to the drawing, 1 represents an alternating current generator which is arranged to be connected to an alternating current circuit 2 by a circuit breaker 3 of any suitable type. While I have shown an alternating current system it is evident that my invention is not limited thereto but may be used in a direct current system.

As shown the circuit breaker 3 is of the well-known latched-in type and is provided with a closing coil 4, which, when energized, closes the circuit breaker, and with a trip coil 5 which, when energized, releases the latch 6 and trips open the circuit breaker. The circuit of the trip coil 5 is controlled by an overload relay 7 which is connected in the circuit of the generator 1 so that the circuit of the trip coil 5 is completed across a suitable source of current 8 when the current supplied by the generator 1 exceeds a predetermined value.

The circuit of the closing coil 4 is controlled by the automatic switching means 10 which is arranged to operate, when the circuit breaker 3 opens, to effect the completion of the circuit of the closing coil 4 to close the circuit breaker 3 after the circuit breaker has been open for a certain length of time. The particular automatic switching means shown comprises a controller 12 and a motor 13, which is permanently connected across the generator 1, for driving the controller. The motor is normally prevented from rotating by means of a stop 14 which engages a projection 15 on the controller 12. The stop 14 is arranged to be moved out of engagement with the projection 15 by means of a relay 16 which is arranged to be energized whenever the circuit breaker 3 is open.

The controller is provided with the sets of contacts 17 and 18 which are adapted to be closed in a predetermined sequence by segments on the controller as the controller 12 is rotated by the motor 13. Both sets of contacts 17 and 18 control the circuit of the closing coil 4. Heretofore, in some of the systems of the character shown in the drawing, it has been the practice to arrange the circuits so that the closing of only one set of contacts by the controller effects the completion of the closing coil circuit. With such an arrangement, however, there is a possibility of the circuit breaker opening and closing in the manner heretofore described if there is an overload connected to the circuit 2 and the motor 13 should fail when the controller is in circuit-closing position. To prevent this undesirable operation of the circuit breaker 3, I arrange the circuits of the system so that the contacts 17 have to be closed before the contacts 18 are closed, in order to complete the circuit of the closing coil 4, and arrange the segments on the controller so that only one set of contacts is closed by the controller at an instant. Therefore, if the circuit breaker 3 opens after the closing circuit is completed by the closing of the contacts 18, the closing circuit can not be closed again until the controller has been moved so as first to close contacts 17 and then to close contacts 18.

When the controller 12 completes the circuit through the contacts 17, the circuit of a control relay 20 is completed and this relay in closing completes a locking circuit for itself so that when the contacts 17 are subsequently opened the relay 20 remains energized so long as the circuit breaker remains open. When the controller completes the circuit through the contacts 18, the circuit of a suitable electromagnetic means 21, shown as a hesitating control relay, is completed, provided the relay 20 is still energized. The energization of the hesitating control relay 20 completes the circuit of the closing coil 4 of the circuit breaker 3. The hesitating control relay is arranged in any well-known manner so as to maintain its contacts closed for a certain length of time after the winding thereof is de-energized thereby insuring that the closing coil 4 is sufficiently energized to close the circuit breaker.

The operation of the system shown is as follows: Let it be assumed that the circuit breaker 3 is open and the control switch 22 is closed thereby rendering the automatic reclosing circuit breaker equipment operative to control the closing of the circuit breaker. When the switch 22 is closed a circuit is completed from one side of the control circuit 8, through the switch 22, conductor 23, coil of the relay 16, conductor 24, auxiliary contacts 25 on the circuit breaker 3, conductor 26, switch 22, to the other side of the control circuit 8. The energization of the relay 16 moves the stop 14 out of engagement with the projection 15 so that the motor 13 is free to rotate the controller 12. If the source 1 is energized, the motor 13 will rotate and when the segments of the controller connect together the contacts 17, a circuit is completed from one side of the control circuit 8, through the switch 22, conductor 23, contacts 17, conductor 28, coil of relay 20, conductor 24 to the other side of the control bus in the manner heretofore described. The closing of the contacts 30 of the relay 20, when it is energized, connects the conductors 23 and 28 together so that a locking circuit is completed for the relay 20 which is independent of the contacts 17 of the controller. Therefore when the circuit through the contacts 17 is subsequently opened, the relay 20 remains energized. After the controller opens the circuit through the contacts 17, the segments on the controller connect the contacts 18 together so that a circuit is completed from one side of the control bus 8, through switch 22, conductor 23, contacts 30 of the relay 20, conductor 28, contacts 18, conductor 32, coil of the hesitating control relay 21, conductor 24 to the other side of the control bus 8. The closing of the contacts 33 of the relay 21, when it is energized, completes a circuit from conductor 23 through the closing coil 4 to conductor 26 to close the circuit breaker 3. The opening of the auxiliary contacts 25 on the circuit breaker 3, when it closes, deenergizes the relays 16, 20 and 21, and after a predetermined time, the opening of the contacts 33 of the hesitating control relay 21 deenergizes the closing coil 4.

If there is no overload connected to the circuit 2, the circuit breaker 3 is held in its closed position by the latch 6. The motor 13 continues to drive the controller 12 until the projection 15 engages the stop 14, but the segments on the controller do not complete any circuits through the contacts 17 and 18 during this movement if the circuit breaker 3 remains closed.

If there is an overload on the circuit 2 when the circuit breaker 3 closes, the overload relay 7 is operated and closes its contacts 35, thereby connecting the trip coil 5 between the conductors 23 and 26. Therefore as soon as the closing coil 4 is deenergized, the circuit breaker 3 opens and the above cycle of operation is repeated. The closing of the auxiliary contacts 25, however, does not effect the immediate reclosing of the circuit breaker as it is necessary for the controller first to connect the contacts 17 together, and then to connect the contacts 18 together before the circuit breaker 3 can close.

With the arrangement shown, the reclosing equipment will continue to reclose the circuit breaker at predetermined intervals so long as there is an overload connected to the circuit 2, but it is evident that any one of the well known arrangements may be used to prevent the reclosing equipment from effecting the reclosing of the circuit breaker after it has been reclosed a predetermined number of times. The length of time between successive reclosures may be made any desirable value by spacing the segments on the controller the proper distance apart.

While I have shown and described my invention in connection with an automatic reclosing circuit breaker system in which the contacts 17 and 18 are arranged to be closed automatically, it is evident that my invention is equally applicable to systems in which these contacts are closed manually. It is also evident to those skilled in the art that other obvious modifications may be made in the arrangement shown without departing from my invention. Therefore, I do not desire to be limited to the exact arrangement shown and described but seek to cover in the appended claims all those modifications thereof that fall within the true spirit and scope of my invention.

What I claim as new and desire to secure by Letters Patent of the United States is:—

1. In combination, an electric circuit, a circuit breaker in said circuit, means responsive to a predetermined condition of said circuit for effecting the opening of said circuit breaker, electromagnetic means for effecting the closing of said circuit breaker, a circuit for said electromagnetic means, a control relay, a circuit for said control relay, contacts in the circuit of said electromagnetic means controlled by said control relay, other contacts in the circuit of said electromagnetic means, and automatic switching means operative in response to the opening of said circuit breaker for controlling said control relay circuit to cause said relay to close the contacts in the circuit of said electromagnetic means which are controlled thereby and for subsequently effecting the closing of said other contacts in the circuit of said electromagnetic means.

2. In combination, a circuit breaker, electromagnetic means for effecting the closing of said circuit breaker, a circuit for said electromagnetic means, a control relay, an energizing circuit for said control relay, a locking circuit for said control relay controlled by the position of said circuit breaker, contacts in the circuit of said electromagnetic means arranged to be completed when said control relay is energized, other contacts in the circuit of said electromagnetic means, and automatic switching means operative when said circuit breaker is open successively to complete said energizing circuit, open said energizing circuit, and effect the closing of said other contacts in the circuit of said electromagnetic means.

3. In combination, a circuit breaker, a closing coil therefor, a circuit for said closing coil, a relay, an energizing circuit for said relay, a locking circuit for said relay, a second relay, an energizing circuit for said second relay, contacts in said closing coil circuit controlled by said second relay, and automatic switching means operative when said circuit breaker is open successively to complete the energizing circuit of said first mentioned relay, interrupt said energizing circuit and complete the energizing circuit of said second mentioned relay.

4. In combination, a circuit breaker, a closing coil therefor, a circuit for said closing coil, a relay, an energizing circuit for said relay, a locking circuit for said relay, a hesitating control relay, an energizing circuit for said hesitating control relay, contacts in said closing coil circuit controlled by said hesitating control relay, and switching means for completing said energizing circuits in a predetermined sequence, said switching means being arranged to prevent both of said energizing circuits being simultaneously energized.

5. In combination, a circuit breaker, a control relay for said circuit breaker, switching means, a circuit for said relay, contacts in said relay circuit arranged to be closed when said circuit breaker is open, contacts in said relay circuit controlled by said switching means, electromagnetic means for effecting the closing of said circuit breaker, a circuit for said electromagnetic means, contacts in said last mentioned circuit controlled by said control relay, and contacts in said last mentioned circuit controlled by said switching means.

6. In combination, a circuit breaker, a control relay, switching means, an energizing circuit for said control relay controlled by said circuit breaker and said switching means, a locking circuit independent of said switching means for maintaining said control relay energized after said energizing circuit is completed, and electromagnetic means for effecting the closing of said circuit breaker controlled by said control relay and said switching means.

7. In combination, a circuit breaker, a control relay, an energizing circuit for said relay controlled by said circuit breaker, contacts in said energizing circuit, a locking circuit for said control relay arranged to be completed when said relay is energized, said locking circuit being independent of said contacts, electromagnetic means for effecting when energized the closing of said circuit breaker, a circuit for said electromagnetic means, contacts in said last mentioned circuit controlled by said relay whereby said circuit can be completed only when said relay is energized, other contacts in the circuit of said electromagnetic means, and automatic switching means controlled by said circuit breaker for closing the contacts in said energizing circuit and said other contacts in the circuit of said electromagnetic means in a predetermined sequence.

8. In combination, an electric circuit, a circuit breaker, means responsive to a predetermined condition of said circuit for effecting the opening of said circuit breaker, closing means for said circuit breaker, a control relay, an energizing circuit for said control relay, a set of contacts in said energizing circuit arranged to be opened when said circuit breaker is closed, a second set of contacts in said energizing circuit, a hesitating control relay for controlling said closing means, a circuit for said hesitating control relay, a set of contacts in said last mentioned circuit controlled by said first mentioned control relay whereby said last mentioned circuit can be completed only when said first mentioned control relay is energized, a second set of contacts in said last mentioned circuit, and automatic switching means for operating said second sets of contacts in a predetermined sequence when said circuit breaker is open, said last mentioned means being arranged to prevent the simultaneous closing of both of said second sets of contacts.

In witness whereof, I have hereunto set my hand this 15th day of April, 1924.

GLENN E. STEWART.